US009467628B2

(12) United States Patent
Geng et al.

(10) Patent No.: US 9,467,628 B2
(45) Date of Patent: Oct. 11, 2016

(54) HIGH DYNAMIC RANGE IMAGE SENSOR

(71) Applicant: Sensors Unlimited, Inc., Princeton, NJ (US)

(72) Inventors: Penghe Geng, Vernon, CT (US); Hongcheng Wang, Farmington, CT (US); Alan Matthew Finn, Heron, CT (US)

(73) Assignee: Sensors Unlimited, Inc., Princeton, NJ (US)

( * ) Notice: Subject to any disclaimer, the term of this patent is extended or adjusted under 35 U.S.C. 154(b) by 41 days.

(21) Appl. No.: 14/468,842

(22) Filed: Aug. 26, 2014

(65) Prior Publication Data

US 2016/0065824 A1 Mar. 3, 2016

(51) Int. Cl.
*H04N 5/228* (2006.01)
*H04N 5/235* (2006.01)
*H04N 5/335* (2011.01)

(52) U.S. Cl.
CPC ............ *H04N 5/2355* (2013.01); *H04N 5/335* (2013.01)

(58) Field of Classification Search
CPC ............ G06K 9/2018; G06T 2200/21; G06T 2207/10144; G06T 2207/20021; G06T 2207/20081; G06T 2207/20208; G06T 5/007; G06T 5/50; H04N 2209/045; H04N 5/2254; H04N 5/2329; H04N 5/2355; H04N 5/238
See application file for complete search history.

(56) References Cited

U.S. PATENT DOCUMENTS

| 6,864,916 | B1 | 3/2005 | Nayar et al. |
| 7,924,321 | B2 | 4/2011 | Nayar et al. |
| 2003/0197793 | A1 | 10/2003 | Mitsunaga et al. |
| 2006/0103746 | A1* | 5/2006 | Mori ............... H04N 5/3651 348/294 |
| 2006/0103749 | A1* | 5/2006 | He ................... H04N 5/2355 348/308 |
| 2006/0239336 | A1* | 10/2006 | Baraniuk ........... H04L 25/20 375/216 |
| 2008/0198235 | A1* | 8/2008 | Chen ................ H04N 5/2353 348/207.99 |
| 2011/0157419 | A1 | 6/2011 | Nayar et al. |
| 2012/0086781 | A1 | 4/2012 | Iddan et al. |

FOREIGN PATENT DOCUMENTS

| EP | 1255410 A2 | 11/2002 |
| WO | 2013089036 A1 | 6/2013 |

OTHER PUBLICATIONS

U.S. Appl. No. 14/162,895, filed Jan. 24, 2014.
S.B.Kang, et al. High Dynamic Range Video, Siggraph 2003. http://research.microsoft.com/apps/pubs/default.aspx?id=75581.
Hongcheng Wang, Ramesh Rask, Narendra Ahuja, High Dynamic Range Video Using Split Aperture Camera.
Shree K. Nayar and Tomoo Mitsunaga, High Dynamic Range Imaging: Spatially Varying Pixel Exposures, CVPR 2000.
Acton et al., Large format short-wave infrared (SWIR) focal plane array (FPA) with extremely low noise and high dynamic range, Proc. SPIE 7298, Infrared Technology and Applications XXXV, 72983E (May 6, 2009).
Dhar et al., Advanced imaging systems programs at DARPA MTO, Proc. SPIE 8868, Infrared Sensors, Devices, and Applications III, 2011.
http://acoutts.com/alex/dual_iso.pdf.
SWIR, http://www.sensorsinc.com/downloads/article_Expanding-The-Dynamic-Range-of-SWIR-Imagery-Jan10.pdf.

(Continued)

*Primary Examiner* — Trung Diep
(74) *Attorney, Agent, or Firm* — Carlson, Gaskey & Olds, PC (57) ABSTRACT

An image processing system has a sensor array with a plurality of pixels. A distinct circuit is associated with each pixel in the sensor array. The circuits are designed such that across the plurality of circuits, there are a plurality of distinct sensitivities to irradiance from a scene to be captured which are spatially pseudo-randomly ordered relative to each other. The image processing system also comprises an image reconstruction algorithm. A method is also disclosed.

15 Claims, 4 Drawing Sheets

(56) References Cited

OTHER PUBLICATIONS

Expanding the Dynamic Range of Short Wave Infrared (SWIR) Imagery by Marc Hansen and Mark C. Stern, photonicsonline.com.
The Design of a High Dynamic Range CMOS Image Sensor in 110nm Technology, Yang Liu, Aug. 2012.
A New Random Color Filter Array with Good Spectral Properties, Laurent Condat, 2009 IEEE.
Color Filter Array Design Using Random Patterns with Blue Noise Chromatic Spectra, Laurent Condat, Image and Vision Computing, 2009.
Belgian Search Report for Belgian Application No. 2015/5538 completed Apr. 21, 2016.

* cited by examiner

HIGH DYNAMIC RANGE IMAGE SENSOR

BACKGROUND OF THE INVENTION

This application relates to an image acquisition and processing technique where the image is captured utilizing a sensor which has different sensitivity levels assigned to different pixels.

Image reconstruction is inherent in any number of technical areas. As an example, surveillance aircraft capture images at multiple wavelengths which must be reconstructed to provide information. These images must be captured relatively quickly, and the accuracy, spatial resolution, and dynamic range must be as high as possible.

However, a natural scene usually has a very high dynamic range, i.e., very bright and very dark areas, requiring for example 20 bits, and standard imaging sensors can acquire less, for example only 8-12 bits. A traditional imaging sensor faces the problem of missing scene details or blooming or serious distortion due to limited dynamic range.

Prior art methods to capture high dynamic range ("HDR") images may use multiple sequential exposures to obtain multiple images at different exposures. Also, they may use multiple discrete sensor arrays with different sensitivities. Further, they may fabricate a single chip with multiple different size pixels to simultaneously capture multiple images with different exposures. In yet another approach, they have attempted to integrate light flux until a pixel reaches saturation where the integration time represents the actual irradiance. One further technique is to use logarithmic response pixels or circuits to nonlinearly extend the dynamic range of a scene. Finally, physical masks or filters have been utilized with pixel-wise attenuation levels arrayed in regular patterns.

With these techniques, the final image is obtained for display by compressing the high dynamic range constructed from the sample data.

All of the prior art approaches have disadvantages. The approach of taking multiple sequential exposures has artifacts due to motion in the scene, since each image is from a slightly different time or length of time. Further, complicated image registration is needed to generate the final image. There are also often artifacts in reconstructed images due to occlusion or mis-registration.

The multiple discrete sensor arrays have the problem that the light is split and reflected to different sensor arrays. The amount of light reaching a sensor is therefore less and this is not well-suited for low light imaging. The cost, size, weight, and power required are also increased due to the extra hardware.

Using multiple size pixels decreases resolution compared to a single size pixel and, thus, also is not ideal.

In the pixel integration time scheme, one main disadvantage is a partially opened transfer transistor could introduce an additional dark current source resulting in higher dark current shot noise. Also, drive circuits are more complex due to multiple signal reads. Additional electronics are required at correspondingly increased cost.

The logarithmic response pixels or circuit scheme has a nonlinear response that is not preferred in most applications since it makes proper color correction difficult across the full range of the sensor output.

The mask scheme has generally been provided with a regular grid mask, which results in low resolution or low quality due to imaging interpolation.

Thus, an improved high dynamic range imaging process is desirable.

SUMMARY OF THE INVENTION

An image processing system has a sensor array with a plurality of pixels. A distinct circuit is associated with each pixel in the sensor array. The plurality of circuits are designed such that across the plurality of circuits, there are a plurality of distinct sensitivities to irradiance from a scene to be captured which are spatially pseudo-randomly ordered relative to each other. The image processing system also comprises an image reconstruction algorithm. A method is also disclosed.

These and other features may be best understood from the following drawings and specification.

DETAILED DESCRIPTION

This disclosure relates to capturing a pseudo-random sensor image. The following description is merely exemplary in nature and is no way intended to limit the disclosure, its application, or uses.

Figures 1, 2:
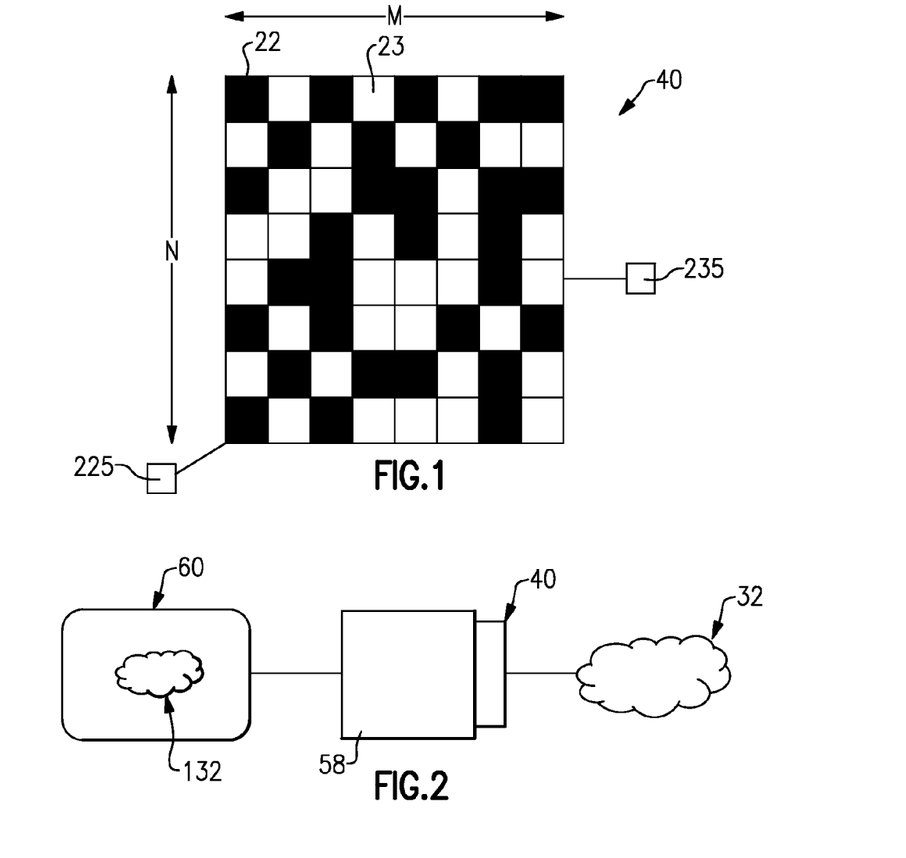
FIG. 1 shows a pseudo-random sensor.
FIG. 2 is a schematic of a system.

In FIG. 1, a sensor 40 is shown schematically. A plurality of pixels in an array of n-by-m pixels is provided. Each pixel in the sensor communicates with a circuit, and the circuits have different sensitivities to irradiance. Thus, some pixels 22 are associated with circuits 225 and are responsive to low irradiance (have high sensitivity) while other pixels 23 are associated with circuits 235 and are responsive to high irradiance (have low sensitivity). While only one of each circuit 225 and 235 are illustrated, and illustrated schematically, each pixel is associated with a circuit. Thus, there will be a plurality of both circuits 225 and 235.

As can be appreciated from FIG. 1, the different sensitivities are irregularly spaced or geometrically unordered, corresponding to a spatially irregularity across the sensor 40. This spatially unordered property is called a pseudo-random pattern. These sensitivities are provided by the circuit which communicates with each pixel and communicates the pixel information to a processor or computer downstream (described better below in FIG. 2).

As shown in FIG. 2, a camera 58 including the sensor 40 may be communicating with a processor or computer 60. The scene 32 to be captured is shown reconstructed and displayed at 132 on the processor or computer 60. The use of the pseudo-randomly ordered sensor provides benefits, as will be described below. Particularly when utilized in combination with modern reconstruction algorithms, more accurate images are provided.

While processor or computer 60 is shown distinct from camera 58 which itself includes sensor 40, processor or computer 60 may be packaged within or otherwise integrated, or embedded, with camera 58 or, even, within sensor 40. The communication between camera 58 and computer 60 may be a wired channel including conductive traces on an integrated circuit or alternatively may be any other optical, wireless, radio channel, or any other type of channel capable of transmitting images and videos between two points including links involving the World Wide Web (www) or the internet.

This invention teaches the acquisition and reconstruction of high quality images from a single exposure using a single sensor 40. Standard sensors would not generate images as high in quality as the pseudo-random sensor 40 and reconstruction techniques of this invention. Multi-dimensional sampling using the techniques of this invention can be used to obtain high image resolution, low cost, high speed, and high dynamic range.

The pseudo-random imaging reconstruction depends on a mathematical property called sparsity. Sparsity is a property whereby some data, e.g., an image, may be represented by only a few non-zero numbers (also called coefficients) which multiply an appropriate set of basis functions. Natural imagery is known to be sparse because these images can be compressed (e.g., using relatively few coefficients and Fourier or Wavelet basis functions) and accurately reconstructed from these few coefficients.

This disclosure creates a pseudo-randomly ordered sensor of several discrete different sensitivity levels where each pixel of an imaging chip communicates with one of circuits 225, 235. An image of a natural scene is captured through the sensor. The pixels corresponding to one sensitivity level are called a pseudo-random image. For each exposure, then, there are several pseudo-random images each corresponding to the pixels of each sensitivity level. From the acquired pseudo-random images, computational methods are used to reconstruct the desired high dynamic range (HDR) image.

A sensor with N discrete different sensitivity levels is created. There are, therefore, N pseudo-random images for any scene corresponding to the N levels. The darkest pseudo-random image comprises the pixels responsive to the lowest irradiance (those with the highest sensitivity). Similarly, the next darkest pseudo-random image comprises the pixels through the next lowest sensitivity level, etc. For each exposure, then, there are N pseudo-random images each corresponding to the pixels of one sensitivity level. For each pseudo-random image (corresponding to each sensitivity level), there are a limited number of observed pixels (1/N), from which to reconstruct the whole image.

In the exemplary embodiment each pixel of a sensor comprising n-by-m pixels has each pixel communicating with a circuit 25, 235 of one sensitivity level.

The method of generating a sensor with a pseudo-random spatial distribution of sensitivities may vary. In one example, different sensitivity levels are assigned independently at each pixel location and uniformly throughout the sensor. In more general cases, levels can be correlated and uniformly distributed on average. The magnitude of the spatial variation of levels in a subset of adjacent locations is the key parameter of a distribution that may control the statistical properties of the sensor. This exemplary distribution depends on the number of locations in the subset and on a correlation function. Specifically, in the former case of the independently distributed levels, the squared magnitude of spatial variation may be directly proportional to the number of levels in the subset. In the latter case of correlated distributions this dependence can be modified. One of the most common examples is a power law dependence where the standard deviation is proportional to $N^\gamma$ where N is the number of levels in a subset and $\gamma$ is a parameter we choose. For image acquisition and image processing applications the correlation, and therefore the parameter $\gamma$, can be optimized to reduce the local non-uniformity of the sensor and thereby increase the quality of image reconstruction.

Figure 3A:
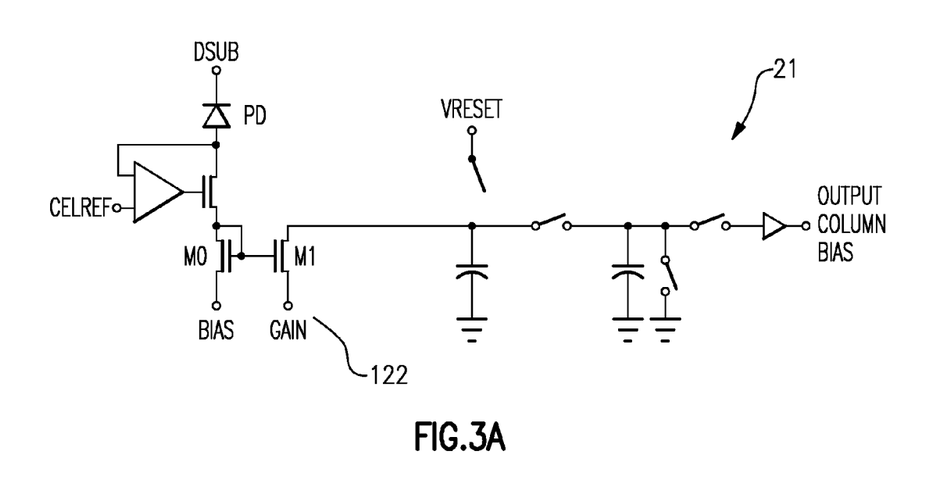
FIG. 3A shows a first circuit embodiment.

In one, FIG. 3A, circuit 21 provides a gain component 122 that may be fixed or may be programmably varied. FIG. 3A shows a silicon read-out integrated circuit (ROIC) that has the ability to continuously change the in-pixel analog gain. By modifying internal biases, the gate-modulated (GMOD) pixel architecture ROIC can change the sensitivity of each pixel of the sensor (focal plane array), resulting in a change in effective capacitance. Each pixel contains a gate-modulated input circuit for converting current to voltage with continuously adjustable gain. The photodiode current flows through M0 with a proportional amount of current mirrored in M1 while the ratio of the currents through M1 and M0 is controlled through the externally set GAIN and BIAS voltages. Again, someone of ordinary skill in the art would recognize how to achieve these variations, armed with the disclosure.

Figure 3B:
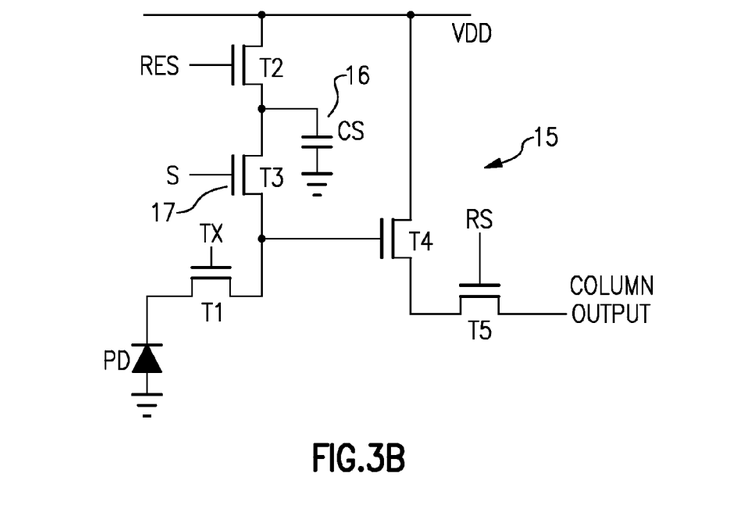
FIG. 3B shows a second circuit embodiment.

FIG. 3B is a prior art embodiment of a lateral overflow capacitor HDR circuit from FIG. 2.16 of Yang Liu, The Design of a High Dynamic Range CMOS Image Sensor in 110 nm Technology, Master of Science Thesis, Delft University of Technology, 2012 which is incorporated herein by reference. FIG. 3B shows a pair of transistor switches T2 and T3 (17).

Figure 3C:
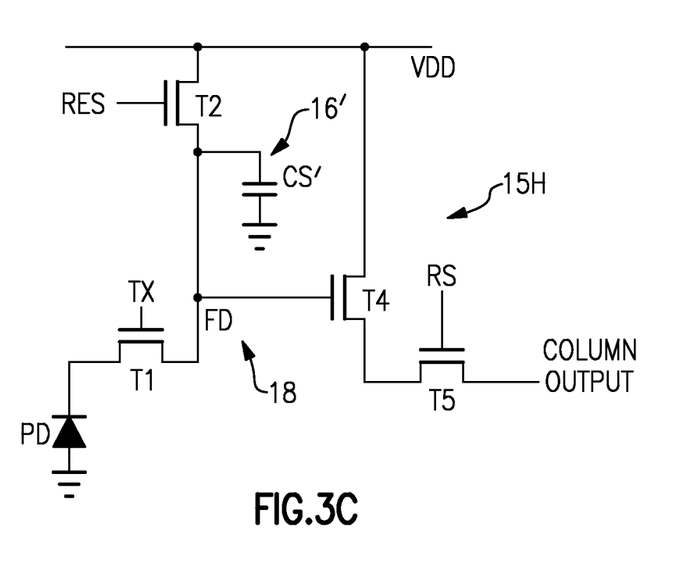
FIG. 3C shows an alternative way to provide distinct sensitivity levels and circuits.

A second embodiment, FIG. 3C, shows a circuit wherein one transistor switch 17 is eliminated from FIG. 3B and the overflow capacitor CS (16) is modified as CS' (16'). Someone of ordinary skill in the art armed with this disclosure would recognize that by changing the capacitance of the overflow capacitor 16', the sensitivities of each pixel may be varied. For example, by configuring the overflow capacitor CS' (16') with different levels of capacitance, we can achieve different sensitivity levels for each pixel. For high sensitivity pixels, the overflow capacitor CS' can be eliminated altogether. Thus, unique circuits could be provided in a pseudo-random manner across all of the pixels of the sensor 40. Additionally, with the modifications of this disclosure the image sensor pixel and the readout circuit designs are simplified.

Additionally, the effective charge storage of a pixel can be changed by adjusting the Floating Diffusion (FD) capacitance (18) such that the high sensitivity pixels have lower capacitance and low sensitivity pixels have higher capacitance. By changing the capacitance corresponding to each pixel, we can change its sensitivity level.

As an example, the capacitance can be changed by increasing area, increasing the thickness of the deposition layer, etc. One possible example is disclosed in U.S. Pat. No. 5,621,230, the relevant disclosure of which is incorporated herein by reference.

While two different sensitivity levels are shown in FIG. 1, it should be understood that three or more sensitivity levels can also be included.

In summary, the various circuits, as shown in FIGS. 3A-3C, result in a readout integrated circuit (ROIC), wherein the circuits provided for each of the pixels have a plurality of distinct levels of sensitivity to irradiance.

A reconstruction algorithm is then used. One embodiment may use a well-known low-rank matrix completion algorithm. Another is to apply a dictionary learning algorithm for image inpainting. The preferred embodiment uses $l_1$/TV (Total Variation) minimization based algorithms. The basic concepts of $l_1$ and TV minimization are well known in the art and are explained further below. The different components of scenes can be reconstructed independently (called independent reconstruction) or, preferably, by joint optimization (called joint reconstruction). The independent reconstruction approach reconstructs each component of the scene independently, using only responses of the pixels corresponding to one sensitivity level. The joint reconstruction approach reconstructs all components of the scene at once, implicitly or explicitly assuming that the structure of the scene components are related and using the responses of pixels corresponding to a plurality of sensitivity levels. Independent reconstruction algorithms are well known in the art. The novel joint reconstruction algorithm below shows better reconstruction accuracy than independent reconstruction.

The disclosure includes the following three steps:
1) Pseudo-random Image Acquisition: a traditional image sensor with a pseudo-random circuit takes a single exposure acquiring a plurality of pseudo-random images.
2) Image Reconstruction, e.g., with Dictionary Learning or $l_1$/TV based approaches, as explained below: Scene components are reconstructed independently or jointly. From the acquired pseudo-random images, there are two methods that may be used to reconstruct the desired high dynamic range (HDR) image. One is a local patch based method, i.e., dictionary learning based image reconstruction. The other is a global image based method, i.e. $l_1$/TV based image reconstruction. These are discussed in detail below.
3) High Dynamic Range Compression: Finally the reconstructed images are combined to generate one single high dynamic range image. The high dynamic range may optionally be compressed for display.

Theoretical mathematical developments over the last decade in sparse sampling and sparse optimization (also called Compressive Sensing and $l_1$-regularized inverse problems) have shown new ways of recovering missing information from appropriately sampled data. The appropriate sampling requires certain pseudo-randomness of the samples in order to work properly.

Regularity in the sampling (spatial distribution of sensitivity levels) limits the successful use of these new mathematical developments. The spatially pseudo-random sampling of a scene at a particular sensitivity level allows one to accurately reconstruct the entire image as if the entire image were acquired at that level.

Natural scenes contain many spatially regular structures, e.g., windows on an office building, the pickets of a picket fence, etc. If a scene is sampled in a regular pattern, the regularity of the samples can cause problems in reconstructing the image. A well-known example is the Moire patterns that can be seen on actor's clothing on television. In this case the regular spatial sampling of a regular spatial pattern on clothing can cause reconstruction artifacts because of the well-known effect called aliasing. Another related known example is when the temporally regular sampling of a rotating wheel may make it appear to be alternatively moving forward and backward as it accelerates or slows. As an extreme example, regularly sampling a scene with a picket fence might have only samples from the pickets (from which the reconstruction would create the image of a solid wall) or only samples from between the pickets (from which the reconstruction would create an image with no fence at all). The reason that pseudo-random sampling works is that it is much more likely to get enough information about any regular structure to allow accurate reconstruction.

The idea of dictionary learning is to learn a compact dictionary from the pseudo-random sampled image to reconstruct the high resolution image. A dictionary (denoted as $\Phi$, also called a sampling matrix or a sensing matrix) for an image, x, allows accurate reconstruction provided that the following two conditions are satisfied:

(1) Sparsity: The mathematical representation of the image, $\Phi x$, is sparse given an over-complete and redundant dictionary $\Phi$ (the redundancy here means that the number of dictionary atoms is much larger than the dimension of image patches of x, which implies that $\Phi x$ contains many zeros). As mentioned above, sparsity is a property whereby an image may be represented by only a few non-zero numbers (also called coefficients) which multiply an appropriate set of basis functions (each basis function is a vector called an atom, the collection of atoms form a dictionary as the dictionary's columns).

(2) Incoherency: The sensing matrix/measurement matrix $\Phi^T$ has full spark. The spark of a dictionary (matrix) is the smallest number of columns that are linearly dependent. Full spark means that no square submatrix of the matrix $\Phi^T$ is singular. If columns are linearly dependent, then they will add no new information to the sampling process. The spark is of use in the theory of compressive sensing, where requirements on the spark of the measurement matrix $\Phi^T$ are used to ensure stability and consistency of the mathematical techniques. A related measure of the incoherency between dictionary atoms is the well-known Restricted Isometry Property (RIP).

The pseudo-randomness of the spatial distribution of sensitivities is important to ensure the incoherency of the sensing matrix $\Phi^T$. A regular grid spatial distribution of sensitivities will have linear dependencies between dictionary atoms such that $\Phi^T$ has non-full spark and has a worse RIP than for a pseudo-random spatial distribution of sensitivities. Dictionary Learning reconstruction results using a spatially regular grid spatial distribution of sensitivities are far worse than when using a pseudo-random spatial distribution of sensitivities. Similarly, for $l_1$/TV based approaches, the pseudo-random sampling matrix (denoted as P, below) is the sensing matrix, which has a good RIP.

Figure 4:
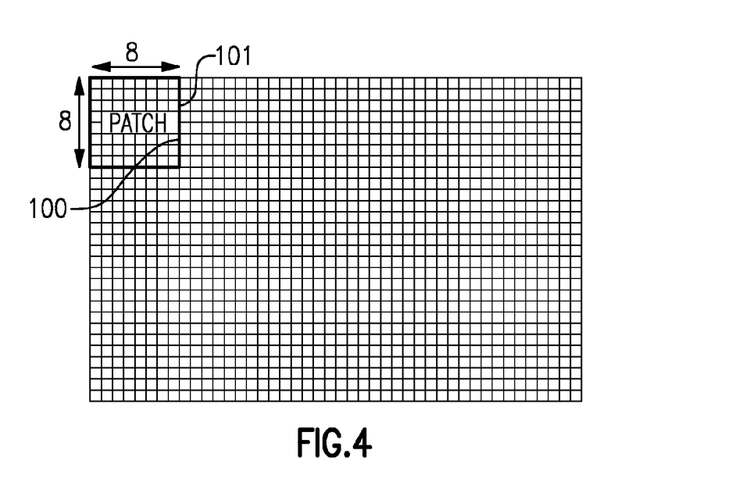
FIG. 4 graphically shows a step in a dictionary learning algorithm.

The dictionary-learning-based image reconstruction uses image patches, see FIG. 4. First, a pseudo-random image is divided into a set of overlapping patches, $x_i$, each of size a×a (for example, a=8). (Hereafter the patch $x_i$ is considered to be a column vector as with the well-known Matlab command vect($x_i$).) An exemplary patch 100 is shown in FIG. 4. The sparsity constraint is exploited in that each patch of the image is represented as a sparse combination of a set of dictionary atoms. Images can be reconstructed from an individual dictionary learned from each pseudo-random image, or from a single dictionary learned from all pseudo-random images. The learning of the dictionary is described as follows.

$$\min_{\alpha,\Phi} \sum_{i=1}^{n} \frac{1}{2} \|x_i - \Phi \alpha_i\|_2^2 \text{ such that } \|\alpha_i\|_1 \leq \tau_0$$

where $x_i$ are image patches, $\Phi$ is the dictionary, $\alpha_i$ are the sparse coefficients, and $\tau_0$ is a small constant. Note that we have actually expressed the $l_0$ sparsity constraint $\|\cdot\|_0$ by the equivalent $l_1$ constraint $\|\cdot\|_1$ as is well known from the compressive sensing literature.

The intuitive interpretation of this optimization problem is that we are computing a dictionary $\Phi$ and coefficients $\alpha$ such that the sum of the differences between the image patches $x_i$ and their approximation from a dictionary, $\Phi \alpha$, is small (each individual patch difference is the term $\|x_i - \Phi \alpha_i\|_2^2$, which measures how different the patch is from its sparse dictionary representation). The notation $\|\cdot\|_2^2$ is a difference measure, i.e., Euclidean distance (squared) between two vectors. The summation $$\sum_{i=1}^{n}$$

adds up all the individual patch differences.

At the same time that we minimize the patch differences, we also want to ensure that the representation is sparse (this is the term $\|\alpha_i\|_1 \leq \tau_0$) which enforces that the sparsity of $\alpha$ is less than some small number $\tau_0$ that we specify. The notation $\|\cdot\|_0$ is the sparsity measure (also called $l_0$), a count of the number of non-zero elements of a vector, which we have replaced by its equivalent (in this case) $\|\cdot\|_1$ (also called $l_1$).

Thus, solving this optimization problem finds a dictionary that can represent all the image patches where each patch representation only needs a few dictionary elements. The mathematical theory guarantees that if we compute this dictionary, we can reconstruct the entire image even if we only have 1/N of the actual pixel values. The dictionary learning proceeds as follows.

We may initially set the dictionary, $\Phi$, to any values or to the well-known singular value decomposition (SVD) of all patches. The learning of a dictionary has two main steps:

Sparse coding step: For each patch $x_i$, compute a sparse representation, $\alpha i$, using any pursuit algorithm (e.g., the well-known basis pursuit algorithm) such that each $\alpha_i$ is a combination of a sparse set of the dictionary atoms.

Dictionary update step: Each atom of the dictionary $\Phi$ is updated as the first eigenvector of the error matrix from the sparsity fitting for the group of patches using this atom.

The two steps repeat until converged. This procedure is well known in the literature.

The independent reconstruction technique described next is $l_1$/TV based image reconstruction. This technique enforces sparsity over a whole image (rather than patches) in the sense that any natural image can be represented as a sparse number of coefficients over some basis (e.g., Fourier, or Wavelet), i.e., an $l_1$ constraint, or it can be represented as sparse piecewise-constant gradient field, i.e., a TV constraint. Images are reconstructed from the acquired pseudo-random images independently or jointly.

The independent reconstruction has the following $l_1$ and TV formulations:

$l_1$ formulation: $\min \mu \|Fx\|_1$ such that $\|Px-b\| \leq \delta$, where x is the image to reconstruct, F is the inverse basis transformation (e.g., Fourier, Wavelet), P is the subsampling operator corresponding to the pseudo-random subsampling in pseudo-random image b, and $\delta$ is a small number we choose.

TV formulation: $\min \|x\|_{TV}$ such that $\|Px-b\| \leq \delta$, where $\|x\|_{TV}$ is the total variation, and P is the subsampling operator corresponding to the pseudo-random subsampling in pseudo-random image b, and $\delta$ is a small number we choose.

This is an independent reconstruction approach which does not exploit known relationships in pseudo-random images at different sensitivity levels. In an independent reconstruction each pseudo-random image is reconstructed separately and later combined into a single HDR image. We know, however, that successive pseudo-random images, corresponding effectively to the same scene imaged at different exposure times, must be highly related to each other. An innovative joint reconstruction approach that simultaneously uses information from all the pseudo-random images may exploit more relationships and, thus, obtain better reconstruction accuracy than independent reconstruction.

To exploit the relationships between pseudo-random images, the pseudo-random images are modeled with some physical imaging constraint, e.g., the well-known camera response function. For the application of High Dynamic Range (HDR) imaging, for example, images are effectively acquired with different exposure times for different pixels, such that the camera response function (CRF) is used to model the irradiance value with regard to exposure time. The imaging model may be represented as $x_i = f(\log(\delta t_i))$, where $\delta t_i$ is the exposure time, and f is the camera response function estimated from the acquired pseudo-random images or computed a priori.

Using the same notation as above, the joint reconstruction is formulated as follows $l_i$ formulation:

$$\min \sum_{i=1}^{n} \|Ff(\log(\delta t_i))\|_1$$

such that $\|Pf(\log(\delta t_i))-b\| \leq \delta$, where n is the number of images to reconstruct.

TV formulation:

$$\min \sum_{i=1}^{n} \|Ff(\log(\delta t_i))\|_{TV}$$

such that $\|Pf(\log(\delta t_i))-b\| \leq \delta$.

For the TV formulation, the well-known Split-Bregman Iteration approach is used to efficiently reconstruct the images by the following three steps:
  (1) Apply the Bregman formulation by introducing auxiliary variables.
  (2) Decouple the $l_1$ and $l_2$ portions of the new cost function.
  (3) Solve the minimization of each cost function alternatively until convergence, by solving a classical Sylvester equation and a shrinkage problem.

This disclosure advantageously exploits the pseudo-random distribution of the spatial distribution of sensitivities. In particular, the disclosed image reconstruction is based on solving an optimization problem (typically mixed-norm $l_2/l_1$ optimization). A key requirement of this type of optimization problem is that the spatial (spatiotemporal) sampling is pseudo-random—specifically, it has the full spark or good RIP. The pseudo-randomness may come from any of a number of underlying pseudo-random number distributions. The pseudo-random spatial distribution of sensitivities can also be optimally designed to have a better spark or RIP property.

Figure 5:
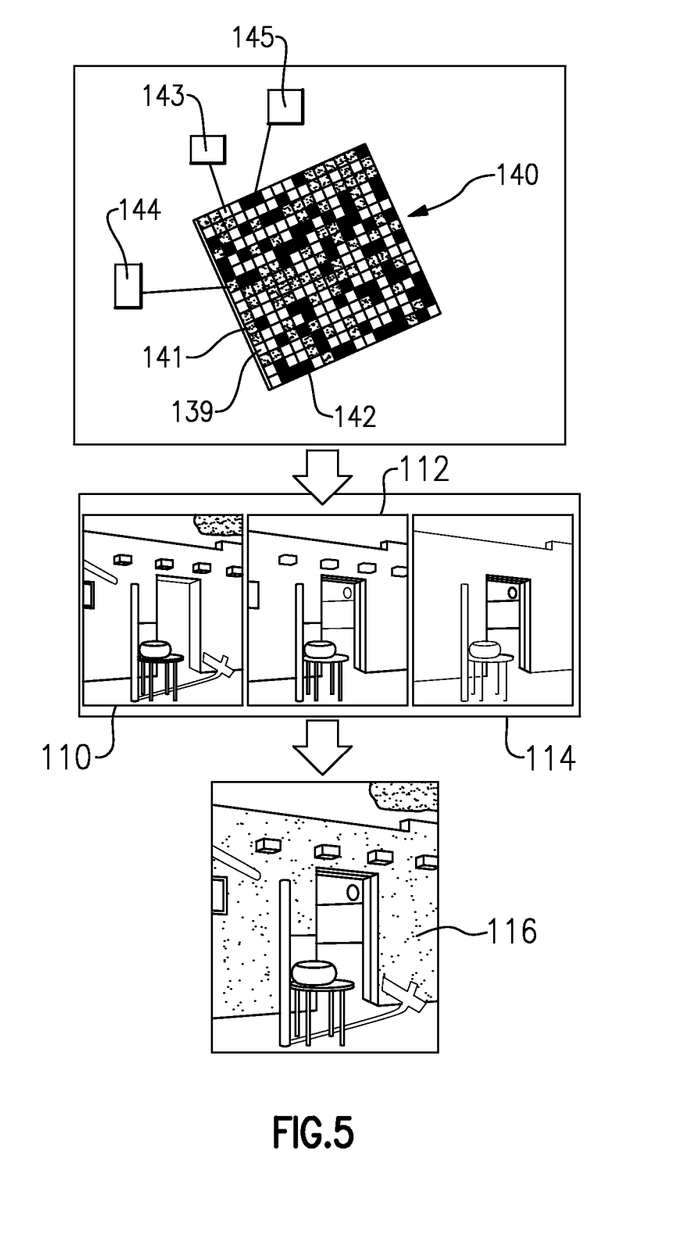
FIG. 5 shows sample images.

FIG. 5 shows three distinct sensitivity level images 110, 112 and 114 that may be captured from a scene. As shown, an associated sensor 140 has three distinct groups of pixels, with 139 being the least sensitive. Pixels 141 are an intermediate level. Pixels 142 are the most sensitive.

Thus, pixels 139 and circuits 143 would capture darker areas such as the interior of the building, image 114. The pixels 141 and circuits 144 would capture the more intermediate levels such as shown in 112. The pixels 142 and circuits 145 are best able to capture bright areas, such as the exterior of the building, image 110. When these several images are reconstructed, as disclosed, a very high resolution image 116 is obtained.

In sum, the use of the pseudo-random circuits provides higher resolution in the ultimate recombined image.

The term "pseudo-random" as used herein need not be truly pseudo-randomly generated. Specifically, the pseudo-random distribution may be truly random or may be approximately random as generated by any number of techniques such as spatial correlation optimized methods. It is critical that the spatial distribution of sensitivities should not be regularly ordered.

This disclosure for HDR imaging first estimates the CRF from the acquired images. The CRF is then used in the mixed-norm optimization framework. The reconstruction of a single high dynamic range (HDR) image from multiple images at different exposure levels using a CRF is known in the art.

Although embodiments of this invention have been disclosed, a worker of ordinary skill in this art would recognize that certain modifications would come within the scope of this disclosure. For that reason, the following claims should be studied to determine the true scope and content of this disclosure.

The invention claimed is:

1. A high dynamic range imaging system comprising:
    a sensor array with a plurality of pixels; and
    a plurality of circuits, with one circuit associated with each pixel in said sensor array, and said plurality of circuits being designed such that across said plurality of circuits, there are a plurality of distinct sensitivities to irradiance from a scene to be captured where said sensitivities are spatially pseudo-randomly ordered relative to each other; and
    an image reconstruction algorithm.

2. The system as set forth in claim 1, wherein said sensor array communicates with a computer provided with said reconstruction algorithm to reconstruct one or more distinct images from one or more of said distinct qualities from the scene.

3. The system as set forth in claim 2, wherein said computer is an embedded processor.

4. The system as set forth in claim 2, wherein said distinct images are combined into a single combined image.

5. The system as set forth in claim 1, wherein said reconstruction algorithm utilizes one or more of dictionary learning, $l_1$/total variation based optimization, and matrix completion.

6. The system as set forth in claim 1, wherein said plurality of circuits include some circuits having a photodiode with a first overflow capacitance and other circuits having a photodiode with a second, lower overflow capacitance to provide said distinct sensitivities to irradiance.

7. The system as set forth in claim 1, wherein a gain in each of said plurality of circuits is varied to provide said distinct sensitivities to irradiance.

8. The system as set forth in claim 1, wherein the pseudo-random ordering is one of truly random, computer program generated approximately random, or spatial correlation optimized approximately random.

9. A method of high dynamic range imaging comprising the step of:
    including a plurality of circuits associated with each pixel in a sensor array, and said plurality of circuits being such that across said plurality of circuits, there are a plurality of distinct sensitivities to irradiance from a scene to be captured where said sensitivities are spatially pseudo-randomly ordered relative to each other to form a plurality of distinct images, and reconstructing the plurality of distinct images to form an image.

10. The method as set forth in claim 9, wherein said sensor array communicates with a computer which reconstructs one or more distinct images from one or more of said distinct qualities of said scene.

11. The method as set forth in claim 10, wherein said computer is an embedded processor.

12. The method as set forth in claim 9, wherein said reconstruction utilizes one or more of dictionary learning, $l_1$/total variation based optimization, and matrix completion.

13. The method as set forth in claim 9, wherein the pseudo-random ordering used is one of truly random, computer program generated approximately random, or spatial correlation optimized approximately random.

14. The method as set forth in claim 9, wherein a gain in said plurality of circuits is varied to provide to provide said distinct sensitivities to irradiance.

15. The method as set forth in claim 9, wherein said plurality of circuits include some circuits having a photodiode with a first overflow capacitance and other circuits having a photodiode with a second, lower overflow capacitance to provide said distinct sensitivities to irradiance.

* * * * *

UNITED STATES PATENT AND TRADEMARK OFFICE
CERTIFICATE OF CORRECTION

PATENT NO. : 9,467,628 B2  Page 1 of 1
APPLICATION NO. : 14/468842
DATED : October 11, 2016
INVENTOR(S) : Penghe Geng et al.

It is certified that error appears in the above-identified patent and that said Letters Patent is hereby corrected as shown below:

In the Claims

In Claim 5, Column 9, Line 47; replace "$l_1$/total" with --$\ell_1$/total--

In Claim 10, Column 10, Line 27; delete "of said"

In Claim 12, Column 10, Line 34; replace "$l_1$/total" with --$\ell_1$/total--

In Claim 14, Column 10, Line 41; after "varied" delete first instance of "to provide"

Signed and Sealed this
Fourth Day of July, 2017

Joseph Matal
*Performing the Functions and Duties of the*
*Under Secretary of Commerce for Intellectual Property and*
*Director of the United States Patent and Trademark Office*